UNITED STATES PATENT OFFICE.

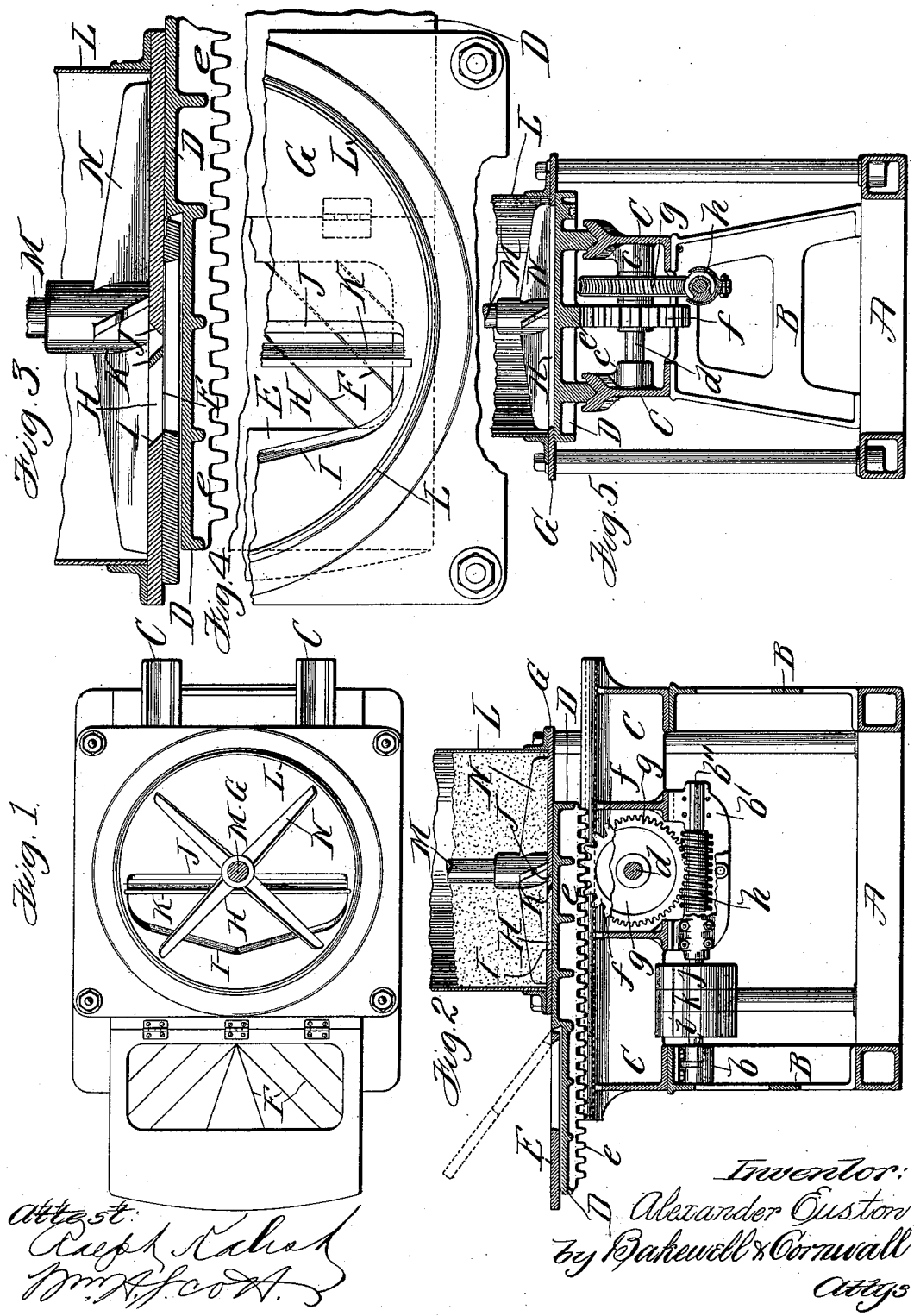

ALEXANDER EUSTON, OF ST. LOUIS, MISSOURI.

LINSEED-CAKE-FORMING APPARATUS.

SPECIFICATION forming part of Letters Patent No. 616,229, dated December 20, 1898.

Application filed April 4, 1898. Serial No. 676,382. (No model.)

*To all whom it may concern:*

Be it known that I, ALEXANDER EUSTON, a citizen of the United States, residing at the city of St. Louis, State of Missouri, have invented a certain new and useful Improvement in Linseed-Cake-Forming Apparatus, of which the following is a full, clear, and exact description, such as will enable others skilled in the art to which it appertains to make and use the same, reference being had to the accompanying drawings, forming part of this specification, in which—

Figure 1 is a top plan view of my improved apparatus. Fig. 2 is a vertical longitudinal sectional view through the same. Fig. 3 is a detail view of the same on the same line of section, showing the molding-frame in another position. Fig. 4 is a top plan view of the same, and Fig. 5 is a vertical cross-sectional view.

This invention relates to a new and useful improvement in linseed-cake-forming apparatus, the object being to dispense with the handling of the seeds from the heater or tempering-kettle to the machine which forms the seeds into a green cake preparatory to the extraction of the oil therefrom. The method of forming this green cake of linseed as now most generally practiced is to first pass the seeds through crushing-rolls, after which the seeds are introduced into what is known as the "heater" or "tempering-kettle," where the seeds are steamed and otherwise treated. The seeds are then taken from the tempering-kettle, placed in an open-ended box, and the box slid along a table, and the seeds deposited in a press which forms the green cake, the cake being sufficiently compact for handling while it is being introduced into the hydraulic presses. After the seeds have been thus initially pressed into cake form, known as the "green" cake, they are wrapped in cloth for the purpose of excluding the atmosphere and preserving the shape of the cake when it is being pressed in the hydraulic or other press for the extraction of oil.

On August 10, 1897, United States Letters Patent No. 587,802 were granted me for certain improvements in heaters or tempering-kettles for the treatment of oleaginous seeds, and the apparatus forming the subject-matter of this application is designed to be used in connection with this patented heater; but I do not, however, wish to be understood as limiting myself to the use of this heater, as there are perhaps other forms of heaters with which my invention could as well be used. In actual practice this heater or tempering-kettle is about eighteen feet high and is filled with the seeds being treated. Unlike the common forms of tempering-kettles most usually employed this patented heater of mine has no jacketed bottom. As stated before, after the seeds have been treated in the tempering-kettle they are formed into green cakes sufficiently compact for handling. My invention relates to an apparatus designed to compress the linseed-meal into cake form preparatory to the cake being introduced into the hydraulic presses.

One of the advantages of the use of my apparatus is that the seeds are not exposed to the air during the time they are being formed into cakes, but are pressed into cake form at the time they leave the tempering-kettle, after which they are wrapped in cloth, as usual, and then placed in the hydraulic press for the purpose of extracting the oil, as is well known.

The special features of this invention reside more particularly in the novel construction of the mold-frame and the arrangement and combination of its coöperating parts, there being suitable mechanism employed for reciprocating this mold-frame under an opening in the heater, which mechanism may be of any desired arrangement, I having shown a very simple train of gearing to effect this reciprocatory movement.

In the drawings, A indicates a suitable base, on the ends of which are suitable standards B, one of said standards carrying a box *b*.

C indicates ways supported upon standards B, said ways being provided with bearings *c*, in which is mounted a shaft *d*. Hangers *b'* also depend from these ways, in which is mounted a shaft *b''*, whose other end is supported by the box *b*.

D indicates a sliding table mounted in ways C, which table has a rack *e* arranged on its under side. This rack meshes with a gear-wheel *f*, mounted on shaft *d*, said shaft being driven by a worm-wheel *g*, which is in mesh with a worm *h* on shaft *b''*. On shaft *b''* are mounted two idle-pulleys and one fixed pulley, the former being lettered $i$ and $j$ and the latter $k$. Two belts (not shown) run in opposite directions on loose pulleys $i$ and $j$, which belts are controlled by a lever or belt-shifter (not shown) for shifting one or the other of said belts to the tight pulley $k$ for transmitting motion through the train of gearing just mentioned to the table D to move the same in one or the other direction, as desired.

Table D carries a mold-frame E on its forward end, which frame is hinged to the table, as shown in Figs. 1 and 2 of the drawings, and which frame is preferably so arranged relative to the table that the upper face of said mold-frame will be on the same plane with the face of table D. The opening in this mold-frame is provided with distributing devices whose function is to prevent the material being packed unevenly in the mold. These distributing devices are preferably in the form of wires F, stretched across the top of the opening in the mold-frame and arranged so as to coöperate with the packing device at an angle, in order to give a shearing cut to the material as it is forced into the mold by the horizontal revolving flights located above. These wires, constituting the distributing device, are arranged, preferably, as shown in Fig. 1—that is, they are substantially fan-shaped; but it is obvious that a different arrangement of these wires could be made to operate with, perhaps, equal success—that is, the wires could be parallel or crossed at any angle or diagonally or transversely disposed, as desired. In stating the function of these wires I might say that experience has demonstrated the fact that a mold-frame having a clear and unobstructed opening will be packed by the flights unevenly, the flights carrying the material to one side of the mold-opening and packing it more firmly there than it is packed at the other side. By the presence of these distributing devices, however, the material carried by the flights will be sheared or cut, so that when the material is in the mold beneath the wires the flights have no further action thereon—that is, the flights have no tendency to disturb the material in the mold-opening by carrying it to one side and packing it there more firmly than on the other. The mold-frame is also arranged with the side walls of its opening converging or tapering, as shown in Figs. 2 and 3, so that when the mold-frame is lifted, as shown by dotted lines in Fig. 2, the cake will be left on the table D with its corners intact. I have found that where the walls of the mold are vertical the act of lifting the mold-frame would break the upper corners of the cake, leaving them ragged and broken.

Table D, with its carried mold-frame E, operates under a plate G, which plate forms the bottom of the heater or tempering-kettle. Plate G is formed with an opening H to one side of its center, the edges of which opening are preferably beveled, as shown, to form cutting edges to shave the molded cake in its movement under said opening. For convenience I will say that I is the front beveled edge of this opening, and J the rear beveled edge. There is also arranged in opening H and preferably near the edge J a knife-bar K, arranged at an angle, as shown in Figs. 2 and 3. This knife-bar is transversely disposed.

L indicates the walls of the tempering-kettle or heater, which are supported by the plate G.

M indicates a vertical shaft centrally arranged relative to the heater and preferably rotated by a suitable gearing. (Not shown.) Shaft M carries flights N, arranged at an angle, as shown, said flights preferably operating on the plate G.

I will assume that the tempering-kettle is filled with crushed seeds and the parts in the position shown in Fig. 2, the flights rotating in the direction so as to force the seeds through the opening H in the plate G. As the mold-opening passes the opening H the seeds are forced into the mold-opening in the mold-frame and packed by the flights N, assisted by the weight of the superimposed material. Fig. 3 shows the mold-frame receiving the seeds, the movement of the table, however, carrying said mold-opening beyond the opening H on its inward movement, after which the belts are shifted so as to impart an outward movement to the table, in which the mold-opening again passes under opening H. During the inward movement of the table D the flights force the material down between knife K and beveled edge J, so that as the front edge of the mold-opening passes these points the edge J compactly fills the front edge of the mold-opening, while on the outward movement knife K and edge I fill the rear edge of the mold-opening. During this operation the wires F cut and distribute the material in the mold-opening, so that it is evenly packed throughout. Beveled edges I and J and the knife K level the material above the distributing devices, so that the upper face of the green cake is smooth and even. When the table reaches its outer limit, the mold having been filled, the frame E is lifted, leaving the green cake on the table, the curvature of the mold-walls preventing the corners of the cake from being broken, after which the cake is wrapped in cloth and placed in the presses, as is well understood. The cake thus formed is sufficiently compact for handling and is not exposed to the atmosphere between the time it leaves the tempering-kettle and when it is formed. Moreover, the cake being wrapped immediately after being formed is in better condition to retain its high temperature while being transferred from the heater to the hydraulic presses. Again, the quantity of seeds used in forming the cakes can be closely regulated, so as to make the resultant cakes uniform in weight. No manual manipulation of the cake is required except in its removal from the molding apparatus to the hydraulic press, whereas under the old practice the weight of the open-ended box and its contained seed is handled back and forth, making it very tiring to the operator.

I am aware that minor changes in the construction, arrangement, and combination of the several parts of my apparatus can be made and substituted for those herein shown and described without in the least departing from the nature and principle of my invention.

Having thus described my invention, what I claim, and desire to secure by Letters Patent, is—

1. The combination with a heater or tempering-kettle, of a mold-frame, and distributing devices extending across the mold-opening in said frame, substantially as described.

2. The combination with a heater, or tempering-kettle, formed with an opening through which the seeds are forced, of a mold-frame adapted to be moved past said opening, and wires arranged across the mold-opening in said frame, substantially as described.

3. The combination with a heater or tempering-kettle formed with an opening, of a mold-frame adapted to be moved past said opening to receive a charge of seeds in its opening, and wires across said mold-opening, said wires being arranged at an angle to the movement of the mold-frame, substantially as described.

4. The combination with a heater or tempering-kettle formed with an opening in its bottom, of a table operating under said opening, a mold-frame carried by said table, distributing devices arranged across the opening in said mold-frame, and means for reciprocating said table and its carried mold-frame, substantially as described.

5. The combination with a heater or tempering-kettle, of a bottom therefor formed with an opening having beveled edges, a knife-bar arranged across said opening, and a mold-frame adapted to coöperate with said opening, substantially as described.

6. The combination with a heater or tempering-kettle, of a bottom plate therefor, which bottom plate is formed with an opening having beveled edges, a knife-bar arranged across said opening, flights arranged above said bottom plate, a reciprocating table carrying a mold-frame, and means for reciprocating said table, substantially as described.

7. The combination with a heater or tempering-kettle, of a bottom plate therefor formed with an opening having beveled edges, flights operating above said opening, a reciprocating table operating beneath said bottom plate, means for reciprocating said table, a mold-frame carried by said table, and distributing devices arranged at the upper edge of the mold-opening in said mold-frame, substantially as described.

8. The herein-described apparatus for forming linseed-cake, the same comprising the following elements in combination: a heater or tempering-kettle for the seeds, which is formed with a discharge-opening in its bottom; angled flights arranged within the heater and above said discharge-opening for forcing the seeds therethrough; a table; means for reciprocating said table, and an open frame or mold which is hinged to the table.

In testimony whereof I hereunto affix my signature, in the presence of two witnesses, this 28th day of March, 1898.

ALEXANDER EUSTON.

Witnesses:
F. R. CORNWALL,
HUGH K. WAGNER.